Aug. 2, 1932.　　　D. C. PRINCE　　　1,870,022
ELECTRIC TRANSLATING CIRCUIT
Filed April 17, 1931
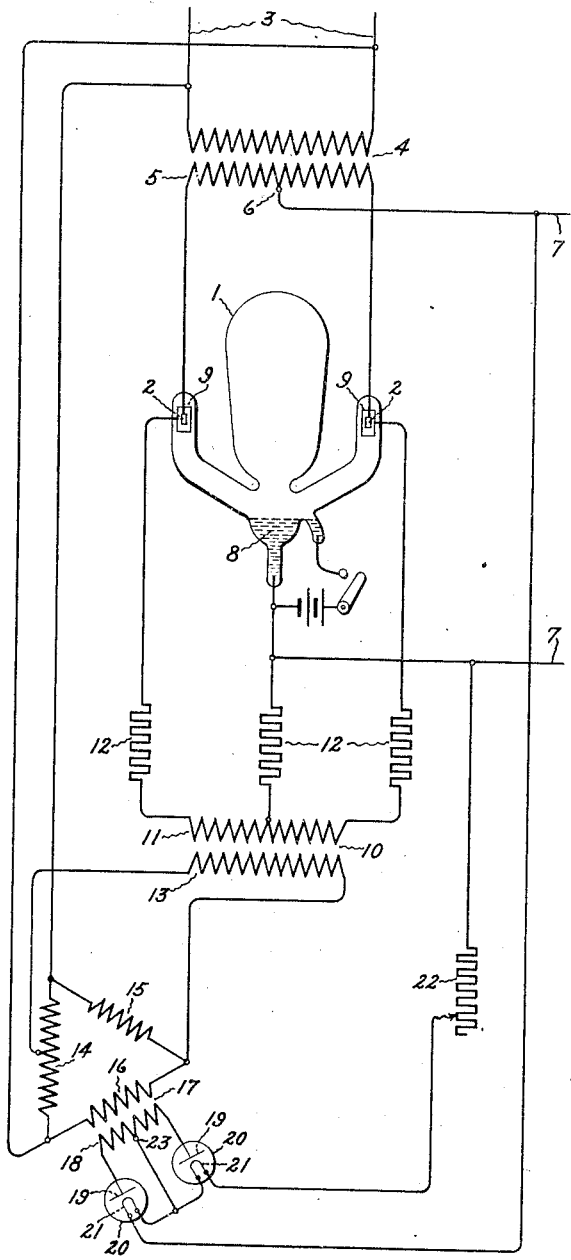
Inventor:
David C. Prince,
by Charles E. Mullan
His Attorney.

Patented Aug. 2, 1932

1,870,022

UNITED STATES PATENT OFFICE

DAVID C. PRINCE, OF SCHENECTADY, NEW YORK, ASSIGNOR TO GENERAL ELECTRIC COMPANY, A CORPORATION OF NEW YORK

ELECTRIC TRANSLATING CIRCUIT

Application filed April 17, 1931. Serial No. 530,879.

My invention relates to electric translating circuits and more particularly to such circuits utilizing electric valves for transmitting energy from an alternating current supply circuit to a direct or alternating current load circuit.

Heretofore there have been proposed numerous arrangements utilizing electric valves for transmitting energy from an alternating current supply circuit to a direct or alternating current load circuit. The majority of the arrangements of the prior art have, however, required manual attention or adjustment in order to control the amount of energy delivered to the load circuit. In the transmission of energy from an alternating current supply circuit to a load circuit the use of electric valves of the vapor electric discharge type has been found particularly advantageous because of the relatively large amounts of power which may be handled at ordinary operating voltages. It has become well known in the art to control the average output of an electric valve, particularly a valve of the vapor electric discharge type, by controlling the phase relation between the grid potential and the anode potential of the valve. By retarding the phase of the grid potential of such a valve, the point in each positive half cycle of anode potential at which the valve is rendered conducting is successively retarded and the average amount of energy transmitted by the valve is correspondingly decreased.

It is an object of my invention to provide an improved electric translating circuit including electric valves in which the flow of energy from an alternating current supply circuit to a load circuit may be controlled automatically in response to a predetermined electrical condition of one of the circuits.

It is a further object of my invention to provide an improved electric translating circuit including electric valves for transmitting energy from an alternating current supply circuit to a load circuit in which an electrical condition of the load circuit may be maintained constant automatically by varying the phase relation between the grid and anode potentials of the valves in response to variations in the electrical condition.

In accordance with one embodiment of my invention, I provide an arrangement for energizing a load circuit from an alternating current circuit through a pair of electric valves. In order to control the amount of energy transmitted by the electric valves I provide an impedance phase shifting circuit for varying the phase relation of the grid potentials of the valves with respect to their anode potentials. The impedance of one of the elements of this phase shifting circuit is automatically controlled in response to variations in a predetermined electrical condition of the translating circuit. For example, one of the elements of the impedance phase shifting circuit may comprise a transformer, the secondary winding of which is short-circuited through a second pair of electric valves. The impedance of this second pair of electric valves may be controlled by controlling their filament excitation in response to a predetermined electrical condition of the translating circuit, such for example as the voltage of the load circuit or the current flowing in either the alternating current supply circuit or the load circuit.

For a better understanding of my invention, together with other and further objects thereof, reference is had to the accompanying drawing, taken in connection with the following description and its scope will be pointed out in the appended claims. The single figure of the accompanying drawing illustrates my invention as applied to an arrangement for transmitting energy from an alternating current supply circuit to a direct current load circuit and for maintaining constant the average voltage of the direct current circuit.

Referring now to the drawing, there is illustrated an arrangement for transmitting energy from an alternating current circuit 3 to a direct current load circuit 7. This arrangement includes an electric valve 1 provided with a pair of anodes 2 upon which potentials are impressed from the alternating current source 3 through a transformer 4. Electric valve 1 may be of any of the several types well known in the art, but I prefer to use a valve of the vapor electric discharge type. The secondary winding 5 of the transformer 4 is connected at its ends to the anodes 2, and its midpoint 6 constitutes the negative terminal of the load circuit 7 of which the positive terminal is connected to the cathode 8 of electric valve 1. While I have illustrated the electric valve 1 as a double anode, single cathode device and connected with the transformer 4 in such a manner as to obtain full wave rectification, it will be obvious to those skilled in the art that two single anode valves may be substituted therefor and that these valves may be reversely connected in parallel if it is desired to supply an alternating current load circuit, all without departing from my invention.

Associated with each anode 2 is a control electrode or grid 9 to which potentials are supplied through a grid transformer 10. The secondary winding 11 of transformer 10 is connected at its extremities through the resistors 12 to the grids 9, respectively, and at its midpoint to cathode 8 through another current limiting resistor 12.

In accordance with my invention the primary winding 13 of transformer 10 is energized through an impedance phase shifting circuit comprising an inductive winding 14, an inductance 15 and the primary winding 16 of a transformer 17. The inductive winding 14 is connected to the alternating current source 3, and winding 13 of grid transformer 10 is connected to an intermediate tap on the winding 14 and to the point of connection between inductance 15 and the primary winding 16 of the transformer 17.

The transformer 17 is provided with a secondary winding 18 which is connected at its extremities to the anodes 19 of electric valves 20, which are preferably of the high vacuum pure electron discharge type. The electric valves 20 are respectively provided with filaments 21 which are connected in series with each other and with a regulating resistor 22. These filaments are shown as energized across the load circuit 7 but it will be obvious that they may be energized from any circuit in proportion to the potential variations of which it is desired to vary the output of the apparatus. For example, the filaments 21 may be energized from a shunt connected in series with the direct current circuit 7 or from a series transformer connected in the alternating current circuit 3, or from an independent circuit. A connection 23 is made from the midpoint of secondary winding 18 of transformer 17 to a point between filaments 21.

It is evident from this connection of the secondary winding 18, that transformer 17 is open circuited as long as filaments 21 remain below the electron emitting temperature and that this transformer will carry a load current proportional to the electron emission in the devices 20 as the filaments 21 become heated.

The winding 14, inductance 15 and primary winding 16 are so proportioned that when the filaments 21 are below the electron emitting temperature, and transformer 17 is therefore open circuited, the grids 9 receive, through grid transformer 10, a voltage which is substantially in phase with the anode voltage. The anodes will, under this condition, pass current for the full normal period and the current output delivered to the load circuit 7 will be a maximum. On the other hand, if the voltage of the load circuit tends to rise, due to a decrease in load, or for any other cause, the filaments 21 are heated to a higher temperature and the resulting electron emission permits current to flow in winding 18. The transformer 17 acts as a non-inductive resistance of a value dependent upon the amount of electron emission. With an increase in electron emission of the filaments 21, the effective resistance of the transformer 17 decreases and the voltage impressed upon the grid transformer 10 is caused to lag behind the anode voltage, thus decreasing the current output of the apparatus, as will be well understood by those skilled in the art. Obviously, with a decrease in voltage of the load circuit 7 the reverse operation will take place.

In operation, the temperature of the filaments 21 is first adjusted by means of resistor 22 to obtain a current flow through the electric valves 20, corresponding to a predetermined voltage on the load circuit 7. Thereafter, any variation of the voltage in circuit 7 causes a change in the filament temperature and consequently change in the equivalent resistance of transformer 17, accompanied by a shift in the phase of the grid potential in the proper direction to return the output voltage of the apparatus to normal.

In case the filaments are not energized from the output circuit 7 of the rectifier 1 but from some other circuit, in proportion to the potential variations of which it is desired to vary the energy transmitted by the apparatus, it is the variation of the voltage in this other circuit, to which the filaments 21 are connected, that produces a variation in the phase relation of the potentials supplied to the grid 9.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, an alternating current supply circuit, a load circuit, an electric valve provided with a control grid for transmitting energy from said supply circuit to said load circuit, an impedance phase shifting circuit comprising a plurality of impedance elements and associated with said grid, a second electric valve for controlling the impedance of one of said impedance elements, and means responsive to an electrical condition of one of said supply and load circuits for controlling the conductivity of said second mentioned valve.

2. In combination, an alternating current supply circuit, a load circuit, an electric valve provided with a control grid for transmitting energy from said supply circuit to said load circuit, an impedance phase shifting circuit comprising a plurality of impedance elements and associated with said grid, a second electric valve for controlling the impedance of one of said impedance elements, said second valve being provided with an electron emitting cathode, and means for exciting said cathode in accordance with an electrical condition of one of said supply and load circuits.

3. In combination, an alternating current supply circuit, a circuit subject to electrical variations, and means for producing a potential variable in phase with respect to that of said supply circuit in accordance with said electrical variations comprising a plurality of impedance elements connected across said supply circuit for producing dephased potentials, one of said elements including an electric valve provided with electron emitting cathode, and means for controlling the emission of said cathode in accordance with said electrical variations.

4. In combination, an alternating current supply circuit, a circuit subject to electrical variations, and means for producing a potential variable in phase with respect to that of said supply circuit in accordance with said electrical variations including a reactor and an impedance device connected across said supply circuit for producing dephased potentials, said impedance device having substantially a resistance characteristic, means for controlling the impedance of said device including an electric valve provided with a filamentary electron emitting cathode, and means for energizing said cathode from said circuit subject to electrical variations.

In witness whereof I have hereunto set my hand.

DAVID C. PRINCE.